United States Patent [19]

Knudsen et al.

[11] Patent Number: 4,981,831

[45] Date of Patent: Jan. 1, 1991

[54] TWICE-AGED POROUS INORGANIC OXIDES, CATALYSTS, AND POLYMERIZATION PROCESSES

[75] Inventors: Ronald D. Knudsen; Max P. McDaniel; Elizabeth A. Boggs; F. Wallace Bailey, all of Bartlesville, Okla.

[73] Assignee: Phillips Petroleum Company, Bartlesville, Okla.

[21] Appl. No.: 223,849

[22] Filed: Jul. 25, 1988

[51] Int. Cl.$^5$ .............................................. B01J 21/06
[52] U.S. Cl. ..................................... 502/236; 502/242
[58] Field of Search ............................. 502/236, 242

[56] References Cited

U.S. PATENT DOCUMENTS

| | | | |
|---|---|---|---|
| 2,456,721 | 12/1948 | Milliken, Jr. et al. | 502/236 |
| 2,873,246 | 2/1959 | Hansford et al. | 502/236 |
| 3,159,588 | 12/1964 | Hansford | 502/236 |
| 3,887,494 | 6/1975 | Dietz | 252/452 |
| 3,900,457 | 8/1975 | Witt | 260/94.9 D |
| 4,018,816 | 4/1977 | Onoda et al. | 502/236 |
| 4,101,722 | 7/1978 | Hogan et al. | 526/106 |
| 4,119,569 | 10/1978 | Dietz | 252/452 |
| 4,169,926 | 10/1979 | McDaniel | 526/106 |
| 4,176,089 | 11/1979 | Neville et al. | 252/452 |
| 4,190,457 | 2/1980 | McDaniel | 106/122 |
| 4,206,297 | 6/1980 | Hoff et al. | 526/106 |
| 4,294,724 | 10/1981 | McDaniel | 252/451 |
| 4,378,306 | 3/1983 | McDaniel et al. | 252/452 |
| 4,405,501 | 9/1983 | Witt | 252/452 |
| 4,436,883 | 3/1984 | Witt | 526/106 |
| 4,622,166 | 11/1986 | Nakazawa et al. | 252/313.1 |
| 4,624,773 | 11/1986 | Hettinger, Jr. et al. | 208/120 |

FOREIGN PATENT DOCUMENTS

| | | |
|---|---|---|
| 0085357 | 8/1983 | European Pat. Off. . |
| 0287347 | 10/1988 | European Pat. Off. . |
| 2295010 | 12/1975 | France . |

*Primary Examiner*—Carl F. Dees
*Attorney, Agent, or Firm*—Lynda S. Jolly

[57] ABSTRACT

A silica-titania cogel or silica-titania-chromium tergel is first aged at a substantially neutral pH, then aged at an alkaline pH, and then spray dried or azeotrope dried to form a xerogel. Optionally, a pore-preserving agent can be added prior to drying. The cogel can be impregnated with a chromium compound. The chromium-containing catalyst is activated by calcination. The activated catalyst can be used as a polymerization catalyst to polymerize mono-1-olefins.

41 Claims, No Drawings

TWICE-AGED POROUS INORGANIC OXIDES, CATALYSTS, AND POLYMERIZATION PROCESSES

BACKGROUND OF THE INVENTION

Supported chromium catalysts have long been a dominant factor in the production of high density olefin polymers such as polyethylene. As originally commercialized, these catalysts were used in solution polymerization processes. However, it early became evident that a more economical route to many commercial grades of olefin polymers was a slurry process, that is, a polymerization process carried out at a temperature low enough that the resulting polymer is largely insoluble in the diluent. However, certain control techniques which are easily carried out in solution polymerization systems become more difficult in the slurry system. This is particularly true with regard to control of molecular weight. In a solution system, the temperature can simply be increased in order to provide a lower molecular weight, higher melt flow polymer. However, in slurry systems, there is a practical limit on temperature increases, since the point is quickly reached wherein the polymer goes into solution and thus the value of the slurry system is lost.

In order to allow maximum utilization of the more commercially desirable slurry system, modifications of the catalyst were developed so as to allow the production of higher melt flow polymer. One such modification is the formation of cogels of silica-titania and tergels of silica-titania-chromium. These gels are either alkaline pH aged or neutral pH aged and water usually is removed by means of azeotropic distillation or washing with a water miscible organic solvent. Another modification is the addition of a pore preserving agent to a silica hydrogel or a silica-titania cogel and water is then removed in a conventional manner.

Unfortunately, it has been found that these catalysts and catalyst supports do not have a sufficiently large pore volume and average pore size to produce a polymer with a desired high melt index. The catalyst surface area is also higher than preferred. Furthermore, these catalysts are less active than desired.

SUMMARY OF THE INVENTION

It is an object of this invention to provide an improved catalyst support.

It is another object of this invention to provide an improved polymerization catalyst.

It is a further object of this invention to provide an improved polymerization process.

It is a further object of this invention to provide an improved olefin polymerization process.

It is yet a further object of this invention to provide an improved process for preparing supported chromium olefin polymerization catalysts.

It is still a further object of this invention to provide a high activity catalyst capable of giving a high melt index polymer.

It is yet a further object of this invention to provide a polymer with a broad molecular weight distribution.

It is still another object of this invention to provide a polymer with increased bulk density.

It is yet another object of this invention to provide a film grade polymer.

It is yet a further object of this invention to provide a catalyst and catalyst support which has an increased pore volume, an increased peak and average pore size, and/or an increased pore diameter or pore radius.

It is still a further object of this invention to provide a catalyst and catalyst support which have a decreased surface area and maintain or increase catalytic polymerization activity.

In accordance with this invention, a silica-titania cogel hydrogel is first aged at a substantially neutral pH, then aged at an alkaline pH, and finally, spray dried or azeotrope dried.

In accordance with another embodiment of this invention, a silica-titania-chromium tergel is first aged at a neutral pH, then aged at an alkaline pH, and finally, spray dried or azeotrope dried.

In accordance with yet another embodiment of this invention, a pore-preserving agent is added to the neutral and alkaline pH aged silica-titania cogel hydrogel or silica-titania-chromium tergel prior to spray drying or azeotrope drying.

DESCRIPTION OF THE PREFERRED EMBODIMENTS

Catalyst

In the description herein, the terms "cogel" and "cogel hydrogel" are arbitrarily used to describe cogelled silica and titania. The term "tergel" is used to describe the product resulting from gelation together of silica, titania, and chromium. References to "silica" mean a silica-containing material generally composed of 80 to 100 weight percent silica, the remainder, if any, being selected from alumina, boria, magnesia, thoria, zirconia, or mixtures thereof. Other ingredients which do not adversely affect the catalyst or which are present to produce some unrelated results can also be present.

The support for the catalysts of this invention must be a cogel of silica and a titanium compound. Such a cogel hydrogel can be produced by contacting an alkali metal silicate such as sodium silicate with an acidic material such as an acid, carbon dioxide, or an acidic salt. The preferred procedure is to utilize sodium silicate and an acid such as sulfuric acid, hydrochloric acid, or acetic acid with sulfuric acid being most preferred due to less corrosivity and greater acid strength. The titanium component must be coprecipitated with the silica and thus most conveniently the titanium compound will be dissolved in the acid or alkali metal silicate solution.

The titanium compound is preferably incorporated with the acid. The titanium compound can be incorporated in the acid in any form in which it will be subsequently incorporated in the silica gel formed on combination of the silicate and the acid (preferably by means of adding the silicate to the acid) and from which form it is subsequently convertible to titanium oxide on calcination. Suitable titanium compounds include, but are not limited to, the halides such as $TiCl_3$ and $TiCl_4$, the nitrates, the sulfates, the oxalates and alkyl titanates. In instances where carbon dioxide is used, the titanium, of course, must be incorporated into the alkali metal silicate itself. Also with acidic salts it is preferred to incorporate the titanium compound in the alkali metal silicate and in such instances the preferred titanium compounds are water soluble materials which do not precipitate the silicate, i.e. are those convertible to titanium oxide on calcination such as, for example, $K_2TiO(C_2O_4)_2 \cdot H_2O$ (titanium potassium oxalate); $(NH_4)_2TiO(C_2O_4)_2 \cdot H_2O$; and $Ti_2(C_2O_4)_3 \cdot 1H_2O$.

The titanium compound is preferably present in an amount within the range of about 0.1 to about 10, preferably about 1 to about 5, and most preferably about 2 to about 5 weight percent, calculated as titanium, based on the weight of the cogel. The preferred titanium ranges result in a catalyst that can have improved activity and a higher melt index polymer.

The catalyst of this invention must contain a chromium compound. This can be incorporated in any of several separate ways. First a tergel can be prepared wherein the chromium compound, as well as the titanium compound, is dissolved in the acidic material or the silicate and thus coprecipitated with the silica. A suitable chromium-containing compound for use in this embodiment, for example, is chromic sulfate.

Another method to incorporate a chromium compound into the catalyst, is to use a hydrocarbon solution of a chromium compound convertible to chromium oxide to impregnate the support after it is spray dried or azeotrope dried (i.e., the xerogel). Exemplary of such materials are tert-butyl chromate, chromium acetylacetonate and the like. Suitable solvents include pentane, hexane, benzene and the like. Surprisingly, an aqueous solution of a chromium compound can also be used after drying. Also, a chromium compound can simply be physically mixed with the support.

After gelation, the cogel or tergel is aged at a substantially neutral pH. Generally, the pH range is from about 5 to about 8 pH units, preferably in the range of about 6 to about 7 pH units. The cogel or tergel is maintained at a temperature in the range of about 15° to about 95° C., preferably in the range of about 70° to about 85° C., for a time of at least about 1 hour, preferably at least about 3 hours. Aging times of greater than about 20 hours do not seem to have any additional advantageous effect on the catalyst support or catalyst. Thus, generally, aging times of about 1 to about 20 hours are used.

Following the substantially neutral pH aging, the cogel or tergel can be agitated to produce a slurry which is washed several times with water and with either an ammonium salt or dilute acid to reduce the alkali metal content of the gel to less than about 0.1 weight percent, based on the total weight of the gel. While various ammonium salts and dilute acid solutions can be employed, the preferred salts are those such as ammonium nitrate (about 0.5–2 wt. % salt) and ammonium salts of organic acids which decompose and volatilize on subsequent calcination.

The substantially neutral pH aged and washed cogel or tergel is then subjected to an alkaline pH aging step. Preferably, the alkaline pH aging is in an aqueous solution with a pH in the range of about 8 to about 12 pH units and most preferably a pH in the range of about 9 to about 11 pH units. Alkaline aging times are in the range of about 1 to about 50 hours, preferably about 5 to about 30 hours, and most preferably about 10 to about 20 hours. The temperature during the alkaline aging process is in the range of about 70° to about 120° C. and preferably in the range of about 80° to about 95° C. The preferred neutral and alkaline aging conditions are optimized to produce a catalyst support and catalyst with increased pore volume, increased pore radius, and/or decreased surface area.

One method of obtaining an alkaline pH is to add at least one compound selected from the group consisting of alkali metal hydroxides, alkali metal silicates, ammonia, ammonium hydroxide, and/or water-soluble amines. Examples of suitable compounds include, but are not limited to, sodium hydroxide potassium hydroxide, sodium silicate, ammonia, ammonium hydroxide, triethylamine, diethylamine, guanidine, and mixtures thereof.

Another method of obtaining an alkaline pH is also another method of incorporating a chromium compound into the cogel. An aqueous solution of a water-soluble chromium compound, which is convertible to chromium oxide on calcination, can be introduced into the cogel prior to spray drying or azeotrope drying. If the water-soluble chromium compound is introduced into the cogel prior to the substantially neutral pH aging, chromium compounds which do not affect the pH are preferred. Examples include, but are not limited to, chromium acetate and chromium nitrate. Chromium trioxide can also be used, but it is less preferred because it is too soluble and tends to drain off with the excess water.

If the water-soluble chromium compound is introduced into the cogel after the substantially neutral pH aging, but prior to the alkaline pH aging, chromium compounds which inherently result in a higher pH can be used. Such chromium compounds include, but are not limited to, coordination chromium compounds having nitrogen-containing groups including double salts and chelates containing $NH_3$ or amines, such as the chromamines. Presently preferred pH increasing chromium compounds include chloropentamine chromium-(III) chloride and hexaminechromium(III) nitrate because of reasonable availability.

Chromium is preferably present in an amount in the range of about 0.1 to about 20 weight percent, more preferably in the range of about 0.1 to about 5 weight percent chromium calculated as $CrO_3$, based on the total weight of the catalyst (support plus chromium compound). These ranges of chromium content provide a catalyst that is excellent in activity.

Prior to drying, the cogel, tergel, or chromium impregnated cogel optionally can contain a pore preserving agent. The silica pore structure preserving agents can be selected from among organic silicon compounds, e.g. triarylsilanols, described in U.S. Pat. No. 4,190,457, the disclosure of which is hereby incorporated by reference, and surfactants. U.S. Pat. No. 4,169,926 discloses suitable anionic, cationic and nonionic surfactants. The nonionic and cationic surfactants are preferred.

Said organic silicon compounds have the structure $$R_nSiA_{4-n}$$

wherein n is an integer of 2 or 3, and wherein each R is a saturated or unsaturated hydrocarbon group wherein each R can be the same or different and wherein A is selected from the group consisting of hydroxy radicals, halides and alkoxyradicals in which the alkyl group therein contains from 1 to about 10 carbon atoms.

Preferably, R is selected from the group consisting of alkyl radicals of from 4 to about 12 carbon atoms, alicyclic radicals of from 4 to about 12 carbon atoms, aryl radicals of from 6 to about 24 carbon atoms, and hydrocarbyl-substituted aryl radicals such as alkylaryl and cycloalkylaryl of from 6 to about 24 carbon atoms.

When an organic silicon compound of U.S. Pat. No. 4,190,456 or a surfactant is employed as the pore preserving agent, the weight ratio of cogel, tergel, or chromium impregnated cogel to surfactant or organic silicon compound can range from about 20:1 to about 500:1, preferably from about 40:1 to about 100:1 for reasons of economy.

Sufficient treating time is allotted to obtain contact of the various added components with the cogel, tergel, or chromium impregnated cogel. Generally, times ranging from about 30 seconds to about 10 hours, preferably 15 minutes to 120 minutes are adequate.

The pore preserving agent can be incorporated in one of the ingredients used to make the cogel, tergel, or chromium impregnated cogel; however, it is preferably incorporated into the cogel, tergel, or chromium impregnated cogel after the washing step, but prior to the alkaline pH aging step, since this avoids loss of the agent during the washing step.

The cogel, containing chromium or not depending upon the point of addition of chromium as noted herein above, or tergel is then spray dried in a manner known in the art to produce a xerogel. For instance, a conventional spray drier can be used utilizing a rotating wheel wherein hot air is passed around the wheel and atomized gel is hit by the air and dried before it impinges upon walls of the drier. In a typical operation, an inlet temperature in the range of about 300° to about 500° C. and an outlet temperature in the range of about 100° to about 200° C. are utilized. The resulting dried material (xerogel) is then calcined in a manner known in the art or in instances where chromium is not yet present, it is impregnated in a solution of chromium and then calcined.

Alternatively, the cogel, containing chromium or not, or tergel can be azeotrope dried, in a manner known in the art, to produce a xerogel. In general, azeotrope drying is a process wherein the water in the catalyst or catalyst support pores is replaced with an organic liquid that has a lower surface tension than water, during a refluxing operation. Preferably, a xerogel is produced by spray drying for economic reasons.

Calcination can take place by heating in the presence of an excess of molecular oxygen at a temperature within the range of about 300° to about 1000° C., preferably about 300° to about 800° C. for about 30 minutes to about 50 hours, more preferably about 2 to about 10 hours. At least a substantial portion of the chromium in low valence stage is converted to the hexavalent form. Preferably this is carried out in a stream of fluidizing air which stream of fluidizing air is continued as the material is cooled.

The catalysts and catalyst supports produced in accordance with this invention have an average pore radius in the range of about 15 to about 150 Å, preferably in the range of about 25 to about 125 Å, and most preferably in the range of about 30 to about 60 Å. The peak pore radius of the catalysts and catalyst supports produced in accordance with this invention are in the range of about 15 to about 120 Å, preferably in the range of about 20 to about 110 Å, and most preferably in the range of about 25 to about 100 Å. The surface area of the catalyst supports and catalysts of the invention range from about 150 to about 500 m$^2$/gm, preferably in the range of about 200 to about 450 m$^2$/gm, and most preferably in the range of about 300 to about 400 m$^2$/gm. Catalysts and catalyst supports produced in accordance with the spray drying embodiment of this invention differ from those produced in accordance with the azeotrope drying embodiment. The spray dried catalysts and catalyst supports have a lower pore volume range. The catalyst supports and catalysts produced in accordance with the spray dry embodiment of this invention have a pore volume in the range of about 0.5 to about 1.5 cc/gm, preferably in the range of about 0.6 to about 1.5 cc/gm, and most preferably in the range of about 0.7 to about 1.1 cc/gm. The catalyst supports and catalysts produced in accordance with the azeotrope dry embodiment of this invention have a pore volume in the range of about 1.7 to about 3 cc/gm, preferably in the range of about 1.8 to about 2.9 cc/gm, and most preferably in the range of about 2.0 to about 2.8 cc/gm. A catalyst with physical characteristics in these above-mentioned ranges can produce a polymer with the desired melt index and, hence, the desired molecular weight distribution.

Polymerization

The chromium impregnated catalyst supports and catalysts of this invention can be used to produce olefin polymers with improved properties. It is known that the melt index and thus the molecular weight of an olefin polymer is responsive to the average pore diameter and pore volume of the catalyst support. By increasing the average pore diameter and the pore volume of the catalyst support, the melt index of the polymer is increased. The catalyst surface area also affects the resultant polymer. Decreasing the catalyst surface area produces an increase in the polymer melt index.

The catalysts of this invention can be used to polymerize at least one mono-1-olefin containing about 2 to about 8 carbon atoms per molecule, preferably ethylene, propylene, 1-butene, 1-pentene, 1-hexene, 4-methyl-1-pentene, and 1-octene. The invention is of particular applicability in producing ethylene homopolymers and copolymers from mixtures of ethylene and 0.5 to 20 mole percent of one or more comonomers selected from 1-olefins containing 3 to 8 carbon atoms per molecule. Exemplary comonomers include aliphatic 1-olefins, such as propylene, 1-butene, 1-pentene, 1-hexene, 4-methyl-1-pentene, 1-octene and other higher olefins and conjugated or non-conjugated diolefins such as 1,3-butadiene, 1,4-pentadiene, 1,5-hexadiene, and other such diolefins and mixtures thereof. Ethylene copolymers preferably constitute at least about 90, preferably 97 to 99.8 mole percent polymerized ethylene units. With ethylene/hexene copolymers, about 98 to 99.8 mole percent ethylene is preferred, the remainder of course being the comonomer. Propylene, 1-butene, 1-pentene, 1-hexene and 1-octene are especially preferred comonomers for use with ethylene.

The polymers can be prepared from the catalyst of this invention by solution polymerization, slurry polymerization, gas phase polymerization, or other polymerization techniques using conventional equipment and contacting processes. Contacting of the monomer or monomers with the catalyst can be effected by any manner known in the art of solid catalysts. One convenient method is to suspend the catalyst in the organic medium and to agitate the mixture to maintain the catalyst in suspension throughout the polymerization process. Other known contacting methods such as fluidized bed, gravitating bed, and fixed bed can also be employed. Reference to the production of ethylene polymers in a particle form process is disclosed in U.S. Pat. No. 3,624,603 which issued Nov. 30, 1971 to Witt, the disclosure of which is hereby incorporated by reference.

The catalyst of this invention is particularly suitable for use in slurry polymerizations. The slurry, or particle form, process is generally carried out in an inert diluent (medium) such as paraffin, cycloparaffin or aromatic hydrocarbon. For predominantly ethylene polymers, a temperature of about 66° to about 110° C. is employed. Pressures in the particle form process can vary from about 110 to about 700 psia (0.65–4.8 MPa) or higher. The catalyst is kept in suspension and is contacted with the monomer or monomers at sufficient pressure to maintain the medium and at least a portion of the monomer or monomers in the liquid phase. The medium and temperature are thus selected such that the polymer is produced as solid particles and is recovered in that form. Catalyst concentrations can be such that the catalyst content ranges from 0.001 to about 1 weight percent based on the weight of the reactor contents.

The polymers produced in accordance with the spray-drying embodiment of this invention have an increased bulk density. The increased bulk density increases reactor output, as well as improving reactor settling efficiency, i.e., the polymer is more easily recovered in a particle form process. Polymers produced in accordance with the spray-drying embodiment of this invention also have a broader molecular weight distribution, as indicated by a higher HLMI/MI ratio and a higher heterogeniety index (HI). As a result, these high bulk density polymers are more easily processed, especially into films. The easier polymer processability also indicates that the catalyst and catalyst support is a very spherical particle, not an irregularly shaped or non-spherical particle.

Hydrogen can be used to control molecular weight, as is known in the prior art. When used, it is generally used at concentrations up to about 2 mole percent of reaction mixture, preferably within the range of about 0.1 to about 1 mole percent of reaction mixture.

Cocatalysts, to enhance the polymerization reaction, can be used as is known in the prior art. Examples of cocatalysts include, but are not limited to, triethylborane, diethylaluminum ethoxide, triethylaluminum, ethylaluminum sesquichloride, and mixtures thereof. When used, a cocatalyst is usually present at concentrations up to about 15 mole percent of reaction mixture, preferably within the range of about 0.1 to about 12 mole percent of the reaction mixture.

EXAMPLES

Example 1

Silica-titania-chromium tergel was prepared in accordance with U.S. Pat. No. 3,887,494 (Dietz), by adding an aqueous solution of sodium silicate to a concentrated solution of titanyl sulfate and chromium (III) sulfate in sulfuric acid, over a period of about 15 minutes. The solution remained clear and set up into a hard gel when a pH of about 7 was reached. The composition, on a dry weight basis, contained 1.0 wt. % Cr and 2.5 wt. % Ti. The tergel was then aged at a pH of about 7 for about two hours at 75°-80° C. After this first aging, the tergel was water washed to remove substantially all sodium. At this stage, the tergel was about 10-12 wt. % solids.

100 gram (g) samples of this material were then slurried in 4 liters of water. Ammonium hydroxide was added to increase the pH to be within the range of 8-10. The temperature was increased and stirring was continued for various times. The temperatures, pH, and times are listed in Table I, in order of aging severity. Additional ammonium hydroxide and water were added periodically to replace that lost by evaporation during this second aging step. After this second aging step, the tergel samples were filtered out of the slurry and stored for later drying.

After the second aging step, each tergel sample was further divided into as many as four sub-samples corresponding to different methods of treating and drying the gel. After drying to form a xerogel, samples were ground and sieved through a 30 mesh screen. The xerogels were then activated by fluidization in a dry air stream at 800° C. for three hours. This activation resulted in a catalyst useful for olefin polymerization. Afterward the catalysts were stored under dry nitrogen. Polymerization tests were carried out in a two-liter stirred autoclave. Typically about 0.05–0.10 g of activated catalyst was charged to the reactor under nitrogen, then one liter of isobutane liquid diluent, then ethylene was supplied on demand to maintain a fixed pressure, 550 psi, in these experiments. Polymerization occurred at 105° C. At the end of the run, the isobutane and ethylene were flashed off, leaving a dry polymer powder. Melt indices (MI) were determined at 190° C. in accord with ASTM 1238-65T condition E, and high load melt indices (HLMI) according too ASTM 1238-65T condition F.

Table 1 lists the results obtained when the tergel samples were oven dried by placing each tergel sample in an oven at 150° C. overnight. In this procedure, the gel experiences the full compressive forces of aqueous surface tension during drying, and thus, generally has a low pore volume. This is confirmed in Table 1, where porosity was determined by nitrogen sorption. As a result of the low pore volume, polymerization productivity in all runs was rather poor. In fact, only the most severly aged sample exhibited any significant productivity. Twice aging lowered the surface area apparently by enlarging the average pore diameter.

TABLE 1

| | Oven Dried Samples | | | | |
|---|---|---|---|---|---|
| Run | 101 | 102 | 103 | 104 | 105 |
| Age Time (hrs) | 0 | 1 | 3 | 11 | 27 |
| Age pH | — | 8 | 9 | 9.5 | 9.5 |
| Age Temp (°C.) | — | 80 | 90 | 95 | 95 |
| Surface Area (m$^2$/g) | 503 | 491 | 452 | 410 | 367 |
| Pore Volume (ml/g) | 0.69 | 0.69 | 0.71 | 0.81 | 0.86 |
| Pore Radius | | | | | |
| Peak (Å) | 27 | 28 | 29 | 38 | 43 |
| Average (Å) | 27 | 28 | 32 | 40 | 47 |
| Productivity (g polymer/g catalyst) | 10 | 0 | 0 | — | 782 |
| Run Time (min) | 28 | 23 | 24 | — | 95 |

Another method of drying the tergel is to use a spray drier. It was found that spray drying generally increased the pore volume slightly over that obtained from oven drying. Catalysts prepared in this way were inactive in the absence of a second aging step, but became very active (2500–3500 g/g-h) after about 30 hours of aging at pH 9° and 85° C. The pore volume of a twice aged, spray dried catalyst is usually around 1.0 cc/g, compared to 0.8 cc/g for the once aged, spray dried material.

Table 2 lists the results obtained from drying some of the tergel samples in the presence of surfactant, which can minimize the effect of aqueous surface tension. In this procedure, 100 g of twice aged tergel sample was slurried in 150 ml of water to which 2.9 g of surfactant, trimethyl (hydrogenated tallow) ammonium chloride, was added. The slurry was stirred for two hours at 25° C.; then the excess liquid was centrifuged off. The tergel was then dried, under air, in an oven at 150° C., for at least 1.5 hours, and activated at 800° C. as described above. Polymerization tests were again conducted at 105° C. as before. Results in Table 2 again emphasize the importance of twice aging. Pore volumes and diameters are generally higher than in Table 1, even for Run 201, but aging improved both. Furthermore, the melt index and high load melt index both increased with aging severity.

TABLE 2

| Surfactant Containing, Oven-Dried Samples | | | |
|---|---|---|---|
| Run | 201 | 202 | 203 |
| Age Time (hrs) | 0 | 11 | 27 |
| Age pH | — | 9.5 | 9.5 |
| Age Temp (°C.) | — | 95 | 95 |
| Surface Area (m²/g) | 443 | 395 | 375 |
| Pore Volume (ml/g) | 0.88 | 1.07 | 1.26 |
| Pore Radius | | | |
| Peak (Å) | 38 | 50 | 58 |
| Average (Å) | 40 | 54 | 67 |
| Productivity (g polymer/g catalyst) | 2070 | 703 | 2684 |
| Run Time (min) | 48 | 60 | 144 |
| Melt Index (g/10 min) | 0.26 | 0.66 | 1.06 |
| HLMI (g/10 min) | 24 | 22 | 78 |

Pore volumes are further increased by washing the tergel in an organic liquid of low surface tension before drying. Table 3 lists results obtained when a 100 g sample of various tergels was washed in four liters of normal propanol. Afterward, the excess liquid was removed by filtration and the gel dried in a vacuum oven at 110° C. overnight. Again, the twice aging step increased the average pore diameter, and thus the melt index potential of the catalyst. In this case, however, the pore volume was not greatly increased.

TABLE 3

| Alcohol Washed, Oven-Dried Samples | | | | | |
|---|---|---|---|---|---|
| Run | 301 | 302 | 303 | 304 | 305 |
| Aging Time (hrs) | 0 | 1 | 3 | 11 | 27 |
| Age pH | — | 8 | 9 | 9.5 | 9.5 |
| Age Temp (°C.) | — | 80 | 90 | 95 | 95 |
| Surface Area (m²/g) | 546 | 523 | 461 | 380 | 364 |
| Pore Volume (m²/g) | 1.83 | 1.75 | 1.81 | 1.81 | 1.92 |
| Pore Radius | | | | | |
| Peak (Å) | 58 | 58 | 67 | 78 | 90 |
| Average (Å) | 67 | 67 | 78 | 95 | 105 |
| Productivity | 3527 | 3779 | 3648 | 3810 | 3526 |
| (g polymer/g catalyst) | | | | | |
| Run Time (min) | 82 | 96 | 56 | 45 | 104 |
| Melt Index (g/10 min) | 1.2 | 1.4 | 1.1 | 1.8 | 1.8 |
| HLMI (g/10 min) | 59 | 63 | 70 | 78 | 91 |

Table 4 demonstrates the use of azeotropic distillation drying on twice aged tergel samples. In this procedure about 100 g of tergel sample was slurried in 1-hexanol and refluxed for about an hour. During this period, water separated out of the condensate and was removed while the hexanol rich layer was returned to the kettle, until all of the water had been extracted from the gel. Then, the excess liquid was removed and the gel dried under vacuum at 110° C. overnight. These catalysts were activated at 800° C. as described above.

Table 4 shows that the aging step again lowers surface area, which reflects the increased pore diameter, while pore volume was only slightly affected. The result is greatly enhanced melt index potential.

TABLE 4

| Azeotropically Dried Samples | | |
|---|---|---|
| Run | 401 | 402 |
| Age Time (hrs) | 0 | 27 |
| Age pH | — | 9.5 |
| Age Temp (°C.) | — | 95 |
| Surface Area (m²/g) | 499 | 357 |
| Pore Volume (m²/g) | 2.09 | 2.17 |
| Pore Radius | | |
| Peak (Å) | 67 | 98 |
| Average (Å) | 84 | 122 |
| Productivity | 4400 | 3621 |
| (g polymer/g catalyst) | | |
| Run Time (min) | 76 | 77 |
| Melt Index (g/10 min) | 1.58 | 2.18 |
| Repeat (g/10 min) | 1.64 | 2.20 |
| HLMI (g/10 min) | 69 | 114 |
| Repeat (g/10 min) | 71 | 102 |

Example 2

This example demonstrates the use of twice aged catalysts prepared according to this invention in a continuous loop reactor, and the improved resultant polymer properties. The catalysts were prepared and aged according to the procedure set forth in Example 1. The second aging step for the twice aged catalysts of Example 2 comprised aging for 30 hours, at 75°-80° C., at a pH of 9-9.5.

Ethylene-hexene copolymers were prepared in a continuous particle form process by contacting the catalyst with the monomers, employing a liquid full loop reactor, having a volume of 23 gallons (87 liters), isobutane as the diluent, and occasionally some hydrogen to regulate the molecular weight of the product. The reactor was operated to have a residence time of 1.25 hrs. The reactor temperature was varied over the range of 90°-110° C., to control molecular weight, and the pressure was 4 Mpa (580 psi). At steady state conditions, the isobutane feed rate was 46 l/hr, the ethylene feed rate was about 30 lbs/hr, and the hexene feed rate was varied to control the density of the product polymer. Polymer was removed from the reactor at the rate of 25 lbs/hr.

The tests were conducted according to the following procedures:

Dart Impact (g); ASTM D 170975. Energy needed to rupture one mil thick film upon impact of a free falling dart. This method establishes the weight of the dart dropped from a height of 26 inches which causes 50 percent of the samples to break. The staircase method is used to determine the 50 percent failure level and the missile weight increment is 15 g. In all instances, the film was 1 mil in thickness.

Tear Resistance (g/mil); ASTM D 1922. This is a modification for polymer film adapted from the Elmendorf tear test used for paper. This method determines the average energy in grams required to propagate a tear through 2.5 inches of film in the machine direction (MD) or transverse direction (TD) as indicated. In all instances, the film was 1 mil in thickness.

Density (g/ml): ASTM D 1505-68 and ASTM D 1928, Condition C. Determined on a compression molded sample, cooled at about 15° C. per hour, and conditioned at room temperature for about 40 hours.

High Load Melt Index (HLMI) (g/10 min): ASTM D 1238. Determined at 190° C. with a 21,600 gram weight.

Melt Index (MI) (g/10 min): ASTM D 1238. Determined at 190° C. with a 2,160 gram weight.

Table 5 lists results from the testing of two catalysts, Runs 501 and 502, prepared according to this invention using the spray drying embodiment, with different levels of titania. These catalysts were distinguished from the once aged catalysts by their dense, spherical shape, and as a consequence, the resultant polymer was also dense and spherical. The improved particle form was evidenced by higher fluff bulk densities, which can lead to more efficient polymer production. For comparison, the results from a once aged, azeotrope dried catalyst, Run 503, are also shown. Runs 501 and 502 show improved bulk densities. Furthermore, although the Run 503 catalyst produced a polymer with a high MI, the catalysts of Runs 501 and 502 produced polymers with similar MI's (i.e., the reactor temperature needed to make a given MI is not much different).

TABLE 5

| | Polymerization in Loop Reactor | | |
|---|---|---|---|
| Run | 501 | 502 | 503 |
| Age Sequence | neutral, alkaline | neutral, alkaline | neutral only |
| Ti (wt. %) | 5 | 2.5 | 2.5 |
| Activation Temp (°C.) | 650 | 650 | 650 |
| Reactor Temp (°C.) | 90 | 95 | 90 |
| Density (g/ml) | 0.937 | 0.937 | 0.938 |
| Melt Index (g/10 min) | 0.26 | 0.17 | 0.32 |
| High Load Melt Index (g/10 min) | 32 | 21 | 27 |
| HLMI/MI | 126 | 124 | 84 |
| Fluff Bulk Density (lb/ft$^3$) | 26.5 | 27.1 | 23.7 |

Table 5 also shows that resins from the invention catalysts, Runs 501 and 502, have a higher shear response (HLMI/MI) than Run 503. This is an indication that the polymer flows better under stress, and it is a desirable property for many extrusion operations, such as film and blow molding. It can also signify that the polymer has a broader molecular weight distribution, a fact that is very apparent in Table 6. Table 6 compares two resins made by the process of this invention, a blow molding type, Run 601, and a film type, Run 603, with two standard commercial resins, Runs 602 and 604. The catalysts in Runs 601–603 were spray dried and the catalyst in Run 604 was azeotrope dried. Based on the HLMI/MI ratio and also the Mw/Mn ratio (weight average over number average determined from size exclusion chromatography) that the polymers of Runs 601 and 603 have a broader molecular weight distribution.

TABLE 6

| | Molecular Weight Distributions | | | |
|---|---|---|---|---|
| | | Resin Type | | |
| | Blow Molding | | Film | |
| Run | 601 | 602 | 603 | 604 |
| Age Sequence | neutral, alkaline | neutral only | neutral, alkaline | neutral only |
| Ti (wt. %) | 5 | 0 | 5 | 2.5 |
| Activation (°C.) | 650 | 760 | 650 | 650 |
| Melt Index (g/10 min) | 0.35 | 0.35 | 0.26 | 0.28 |
| HLMI (g/10 min) | 34.7 | 31.5 | 30.4 | 19.3 |
| HLMI/MI | 99 | 90 | 117 | 69 |
| Density (g/ml) | 0.954 | 0.955 | 0.937 | 0.938 |
| Mw | 155,000 | 138,000 | 167,000 | 166,000 |
| Mn | 11,200 | 18,800 | 9,600 | 13,700 |
| Mw/Mn | 13.2 | 7.3 | 17.4 | 12.1 |

As a result of the different molecular weight distribution resins made from the catalysts of this invention, Runs 601 and 603, extrude more easily than conventionally prepared resins Runs 602 and 604. This is particularly important in the blowing of film resins.

Table 7 shows an example of 1 mil film blown on a high density line. The catalyst in Run 701 was spray dried and the catalyst in Run 702 was azeotrope dried. Despite the fact that the Run 701 resin has a lower MI than Run 702, Run 701 resin processes at faster rates. In addition, Run 701 resin has superior properties as can be seen from the dart impact resistance, and the elmendorf tear resistance.

TABLE 7

| | Blown Film Tests | |
|---|---|---|
| Run | 701 | 702 |
| Age Sequence | neutral, alkaline | neutral only |
| Ti (wt. %) | 2.5 | 2.5 |
| Melt Index (g/10 min) | 0.14 | 0.25 |
| Max. Blowing Rate (lb/in-hr) | 12.7 | 10.5 |
| Max. Extruder Speed (rpm) | 76 | 54 |
| Dart Impact (g) | 150 | 109 |
| Tear Resistance | 52.0 | 47.6 |
| MD (g/mil) | | |
| TD (g/mil) | 278 | 478 |

Polyethylene polymers made from the catalysts of this invention also displayed greatly improved properties for blow molding applications. This is demonstrated in Table 8, where three polymers made from twice aged silica-titania catalysts, Runs 801–803, were compared to a blow molding resin made from a once-aged catalysts, Run 804. The catalysts in Runs 801–804 were all spray dried. These tests were done on one gallon bottles of 120 g weight. Blow molding was done on a single head Uniloy machine. Bell ESCR was determined by ASTM D 1693, condition A at 50° C. The polymers of Runs 801, 802 and 803 have a higher balance of ESCR and stiffness as gauged by the resistance to top load. This is a highly desirable characteristic.

TABLE 8

| | Blown Bottle Tests | | | |
|---|---|---|---|---|
| Run | 801 | 802 | 803 | 804 |
| Age Sequence | neutral, alkaline | neutral, alkaline | neutral, alkaline | neutral only |
| Ti (wt. %) | 5 | 2 | 2 | 0 |
| Activation Temp (°C.) | 649 | 649 | 777 | 777 |
| Melt Index (g/10 min) | 0.35 | 0.23 | 0.24 | 0.35 |
| Bell ESCR (hrs) | 340 | 109 | 70 | 50 |
| Bottle ESCR, (hrs) | 260 | 100 | 53 | 55 |
| Top Load (kg, 10-min) | 31 | 28 | 30 | 27 |

While this invention has been described in detail for the purpose of illustration, it is not to be construed as limited thereby but is intended to cover all changes and modifications within the spirit and scope thereof.

That which is claimed is:

1. A process to make a porous inorganic oxide comprising the steps of:
    (a) forming a silica-titania cogel hydrogel;
    (b) aging said cogel under substantially neutral pH conditions;
    (c) aging the thus neutral-aged cogel under alkaline pH conditions in an aqueous solution at a sufficient pH, for a sufficient time and at a sufficient temperature to accomplish at least one of decreasing surface area, increasing pore volume, and increasing pore radius of the xerogel; and
    (d) spray-drying the thus twice-aged cogel to form a xerogel.

2. A process according to claim 1 further comprising the step of adding a pore-preserving agent selected from the group consisting of surfactants, organic silicon compounds, and mixtures thereof to said twice-aged cogel.

3. A process according to claim 2 wherein said pore-preserving agent is an organic silicon compound, and wherein said organic silicon compound is selected from the group consisting of tri-t-butylsilanol, tri-t-octylsilanol, tricyclohexylsilanol, triphenylsilanol, tribenzylsilanol, tri-1-naphthylsilanol, tri-4-phenanthrylsilanol, tri-o-tolylsilanol, tri-p-cumenylsilanol, tris(4-pentyl-1-naphthyl)silanol, tris(10-decyl-9-anthryl)silanol, tris(3-cycloheptylphenyl)silanol, tris(7-phenyl-1-naphthyl)silanol, diphenylsilanediol, di-1-naphthylsilanediol, dicyclododecylsilanediol, di-t-octylsilanediol, triphenylchlorosilane, tri-1-naphthylbromosilane, dicyclohexyl dichlorosilane, diphenyldiethoxysilane, phenylcyclohexylsilanediol, diphenyl-t-butylchlorosilane, and mixtures thereof.

4. A process according to claim 1 further comprising incorporating a chromium compound into said porous inorganic oxide.

5. A process according to claim 4 wherein said chromium compound is incorporated by adding an aqueous solution of a chromium compound to said hydrogel, prior to spray-drying.

6. A process according to claim 1 wherein said cogel contains titanium in the range of about 0.1 to about 10 weight percent, based on the weight of the cogel.

7. A process according to claim 1 wherein said substantially neutral pH aging is in an aqueous solution with a pH in the range of about 6 to about 7 pH units, for a time of at least 2 hours, at a temperature in the range of about 15° to about 95° C.

8. A process according to claim 1 wherein said alkaline pH aging is in an aqueous solution with a pH in the range of about 8 to about 10 pH units, for a time in the range of about 1 minute to about 50 hours, at a temperature in the range of about 70° to about 120° C.

9. A process according to claim 1 wherein said aqueous solution comprises water and at least one compound selected from the group consisting of alkali metal hydroxides, alkali metal silicates, ammonia, and mixtures thereof.

10. A process according to claim 4 wherein said chromium compound is incorporated by impregnating said spray-dried xerogel with a chromium compound, wherein said xerogel contains chromium in the range of about 0.1 to about 20 weight percent, based on the weight of the xerogel.

11. A process according to claim 10 further comprising the step of heating said chromium impregnated xerogel at a temperature in the range of about 300° to about 1000° C., for a time in the range of about 30 minutes to about 50 hours, in an oxidizing atmosphere.

12. A process according to claim 1 wherein said silica-titania cogel is a silica-titania-chromium tergel.

13. A process according to claim 12 further comprising the step of adding a pore-preserving agent selected from the group consisting of surfactants, organic silicon compounds, and mixtures thereof to said twice-aged hydrogel.

14. A process according to claim 13 wherein said pore-preserving agent is said organic silicon compound, and wherein said organic silicon organisilicon compound is selected from the group consisting of tri-t-butylsilanol, tri-t-octylsilanol, tricyclohexylsilanol, triphenylsilanol, tribenzylsilanol, tri-1-naphthylsilanol, tri-4-phenanthrylsilanol, tri-o-tolylsilanol, tri-p-cumenylsilanol, tris(4-pentyl-1-naphthyl)silanol, tris(10-decyl-9-anthryl)silanol, tris(3-cycloheptylphenyl)silanol, tris(7-phenyl-1-naphthyl)silanol, diphenylsilanediol, di-1-naphthylsilanediol, dicyclododecylsilanediol, di-t-octylsilanediol, triphenylchlorosilane, tri-1-naphthylbromosilane, dicyclohexyldichlorosilane, diphenyldiethoxysilane, phenylcyclohexylsilanediol, diphenyl-t-butylchlorosilane, and mixtures thereof.

15. A process according to claim 12 wherein said silica-titania chromium tergel contains titanium in the range of about 0.1 to about 10 weight percent, based on the weight of the tergel.

16. A process according to claim 12 wherein said spray-dried silica-titania-chromium xerogel contains chromium in the range of about 0.1 to about 20 weight percent, based on the weight of the xerogel.

17. A process according to claim 12 wherein said neutral pH aging is in an aqueous solution with a pH in the range of about 6 to about 7 pH units, for a time of at least 2 hours, at a temperature in the range of about 15° to about 95° C.

18. A process according to claim 12 wherein said alkaline pH aging is in an aqueous solution at a sufficient pH, for a sufficient time and at a sufficient temperature to accomplish at least one of decreasing surface area, increasing pore volume, and increasing pore radius of the xerogel.

19. A process according to claim 12 wherein said alkaline pH aging is in an aqueous solution with a pH in the range of about 8 to about 10 pH units, for a time in the range of about 1 minute to about 50 hours, at a temperature in the range of about 70° to about 120° C.

20. A process according to claim 19 wherein said aqueous solution comprises water and at least one compound selected from the group consisting of alkali metal hydroxides, alkali metal silicates, ammonia, and mixtures thereof.

21. A process according to claim 12 further comprising the step of heating said silica-titania-chromium spray dried xerogel at a temperature in the range of about 300° to about 1000° C., for a time in the range of about 30 minutes to about 50 hours, in an oxidizing atmosphere.

22. A catalyst support produced by the process of claim 1.

23. A catalyst support produced by the process of claim 2.

24. A catalyst produced by the process of claim 10.

25. A catalyst according to claim 24 with a pore volume in the range of about 0.7 to about 1.1 cc/gm, an average pore radius in the range of about 30 to about 60 Å, and a surface area in the range of about 300 to about 400 m$^2$/gm.

26. A catalyst produced by the process of claim 12.

27. A catalyst produced by the process of claim 13.

28. A process to make a porous inorganic oxide comprising the steps of:
(a) forming a silica-titania cogel hydrogel;
(b) aging said cogel under substantially neutral pH conditions;
(c) aging the thus neutral-aged cogel under alkaline pH conditions in an aqueous solution at a sufficient pH, for a sufficient time and at a sufficient temperature to accomplish at least one of decreasing surface area, increasing pore volume, and increasing pore radius of the xerogel; and (d) azeotrope drying the thus twice-aged hydrogel to convert said hydrogel to a xerogel.

29. A process according to claim 28 further comprising the step of adding a pore-preserving agent selected from the group consisting of surfactants, organic silicon compounds, and mixtures thereof to said twice-aged cogel.

30. A process according to claim 28 further comprising incorporating a chromium compound into said porous inorganic oxide.

31. A process according to claim 30 wherein said chromium compound is incorporated by impregnating said azeotrope-dried xerogel with a chromium compound, wherein said xerogel contains chromium in the range of about 0.1 to about 20 weight percent, based on the weight of the xerogel.

32. A process according to claim 31 further comprising the step of heating said chromium impregnated xerogel at a temperature in the range of about 300° to about 1000° C., for a time in the range of about 30 minutes to about 50 hours, in an oxidizing atmosphere.

33. A process according to claim 28 wherein said silica-titania cogel is a silica-titania-chromium tergel.

34. A process according to claim 33 further comprising the step of adding a pore-preserving agent selected from the group consisting of surfactants, organic silicon compounds, and mixtures thereof to said twice-aged hydrogel.

35. A process according to claim 33 further comprising the step of heating said silica-titania-chromium azeotrope dried xerogel at a temperature in the range of about 300° to about 1000° C., for a time in the range of about 30 minutes to about 50 hours in an oxidizing atmosphere.

36. A catalyst support produced by the process of claim 28.

37. A catalyst according to claim 36 with a pore volume in the range of about 2.0 to about 2.8 cc/gm, an average pore radius in the range of about 100 to about 200 Å, and a surface area in the range of about 300 to about 400 m²/gm.

38. A catalyst produced by the process of claim 32.

39. A catalyst produced by the process of claim 35.

40. A process to make a catalyst comprising:
(a) forming a silica-titania-chromium tergel;
(b) aging said tergel under substantially neutral pH conditions, said conditions comprising a pH of about 7, for a time of about 2 hours, and a temperature in the range of about 80° to about 95° C.;
(c) aging the thus neutral-aged tergel under alkaline pH conditions, said conditions comprising using ammonium hydroxide to achieve and maintain a pH in the range of about 8 to about 10, for a time in the range of about 5 to about 30 hours, and a temperature in the range of about 80° to about 95° C.;
(d) spray-drying the thus twice-aged tergel to form a xerogel; and
(e) calcining said xerogel under air at a temperature in the range of about 300° to about 800° C., for a time in the range of about 2 to about 10 hours.

41. A catalyst produced by the process of claim 40.